Figure 1:
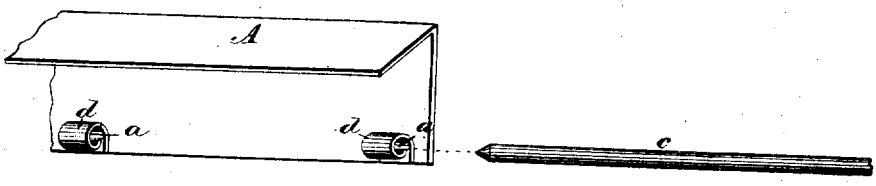

2 Sheets--Sheet 1.

A. SONNEKALB & J. W. LIEB.

Traveling Bags.

No. 5,299. Reissued Feb. 25, 1873.

Witnesses.

Harry King.

Oscar Farrar

Inventor.

John W. Lieb

Assignee of

Sonnekalb & Lieb by Dodges & Son

Attys.

AM. PHOTO-LITHOGRAPHIC CO. N.Y. (OSBORNE'S PROCESS)

2 Sheets--Sheet 2.

A. SONNEKALB & J. W. LIEB.

Traveling Bags.

No. 5,299. Reissued Feb. 25, 1873.

Witnesses.

Harry King.

Oscar Farrar

Inventors.

John W. Lieb

Assignee of

Sonnekalb & Lieb by Dodges & Son

Attys.

AM. PHOTO-LITHOGRAPHIC CO. N.Y. (OSBORNE'S PROCESS.)

UNITED STATES PATENT OFFICE.

ALBERT SONNEKALB AND JOHN W. LIEB, OF NEWARK, NEW JERSEY; SAID SONNEKALB ASSIGNOR TO SAID LIEB.

IMPROVEMENT IN TRAVELING-BAGS.

Specification forming part of Letters Patent No. 52,902, dated February 27, 1866; reissue No. 5,299, dated February 25, 1873.

*To all whom it may concern:*

Be it known that ALBERT SONNEKALB and JOHN W. LIEB, of Newark, in the county of Essex and State of New Jersey, did invent certain new and useful Improvements in Carpet-Bags; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use the invention, I will proceed to describe it.

This invention consists in constructing the jaws or frame of carpet-bags, valises, or traveling-bags with grooves or clips, as a means of attaching or securing the cloth or material which constitutes the body of the bag to the frame; and also in the use of a wire, rod, or strip to assist in securing the body to the frame, all as hereinafter more fully explained.

The various figures of the drawing represent a portion of a carpet-bag embodying the invention.

The frame or jaw A is made of sheet metal, in any of the known forms so far as its general construction is concerned, there being, of course, two of these jaws, and they made to shut together in such a manner that one shall overlap the other, this, however, being no part of the present invention.

Heretofore the usual method of securing the cloth or other material composing the body of the bag to the jaws or frame has been to lay the edge of the material along the side of the jaw; then place on it a strip of metal, and fasten all together by means of rivets. In some instances the cloth or other material is wrapped around the jaw or frame, and, being cemented or pasted thereto, has its edge brought down below the edge of the frame, and secured to the main body by pasting or sewing it fast. This invention has for its object to dispense with these methods of fastening the body to the frame, and to provide a simpler and cheaper means for accomplishing this result. To accomplish this the jaws are constructed with grooves or clips to receive and hold the edge of the material and attach it firmly to the frame. This, as shown in the drawing, may be done in various ways.

Figure 2:
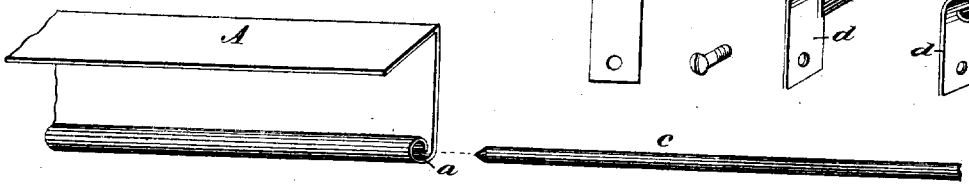
Figure 3:
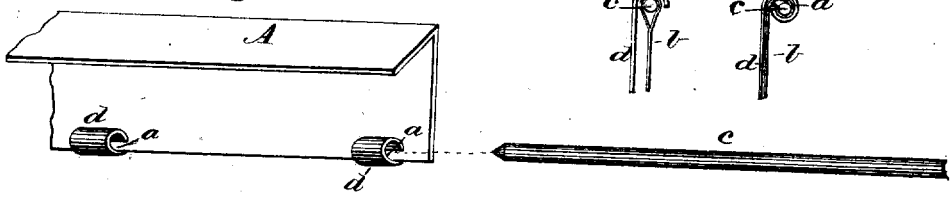
Figure 7:
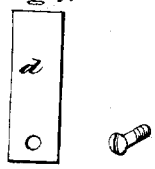
Figure 8:
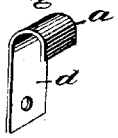
Figure 9:
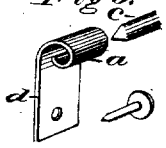

In Figure 1 A represents a portion of a jaw, having clips *a* attached by rivets, solder, or otherwise. Fig. 3 represents the same device with the clips *a* turned in the reverse direction. These clips *a* may be formed of a strip of metal, *d*, as shown in Fig. 7, it having a hole near one end, through which a rivet or screw is to be passed in securing it to the jaw. This piece *d* then has its upper end bent to form a groove or lip *a*, as shown in Figs. 8 and 9. In Fig. 2 we have shown the jaw A as having a groove formed its whole length by simply turning over the lower edge of the metal composing the jaw.

Figure 4:
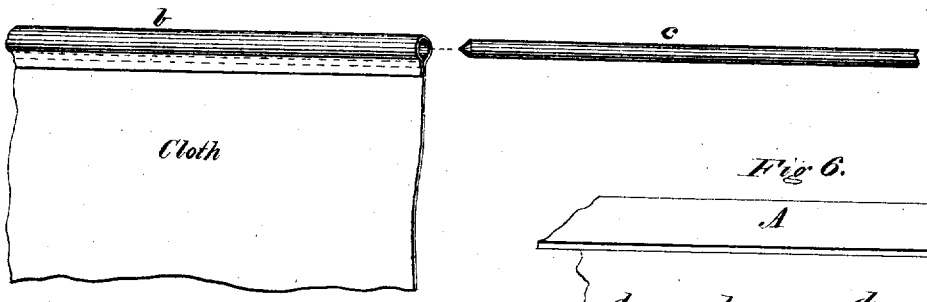

After having prepared the jaws, as above set forth, we next take the cloth or material which is to be attached and fold over its edge so as to form a loop, *b*, as shown in Fig. 4, and secure it by one or more rows of stitching, the loop thus formed being of the proper size to allow a wire, *c*, or any similar rigid material to be inserted therein.

When thus prepared the body may be secured to the jaws or frame in either of the following ways: The loop may have the rod *c*, and the edge of the fold then placed in the groove or lips, and the latter then be pressed down tight upon it, thus locking or securing the body of the bag firmly to the frame; or the fold may be first placed edgewise in the groove or lips, the latter being pressed more nearly shut, and the rod *c* then be shoved into the loop, thereby locking the body to the frame; or the fabric may be drawn endwise into the groove, and the rod be subsequently inserted in the loop; or the rod may be inserted in the loop first, and both be then shoved or drawn endwise into the groove, it being immaterial and merely a matter of choice or convenience for the operator as to the manner of performing the operation; the important point being to secure the edge of the fabric or body of the bag in the groove or lips so that it will not draw out.

Figure 10:
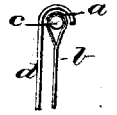
Figure 11:
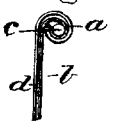
Figure 6:
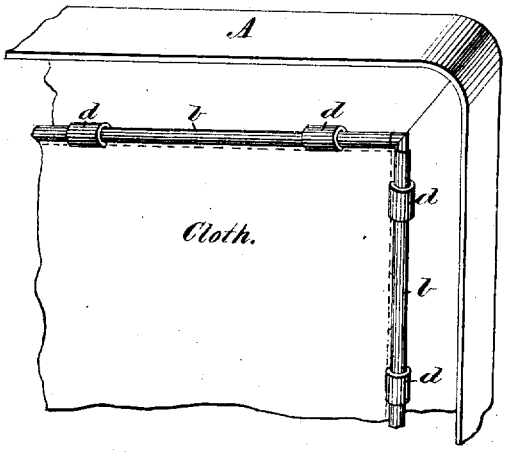
Figure 5:
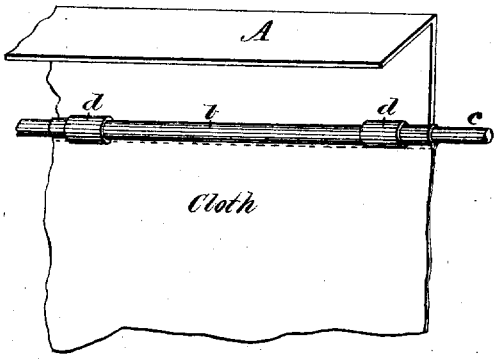

When lips are attached, as represented in Fig. 1, the folded edge of the body can be inserted in either of the ways above described, the same as where a continuous groove is used; but when the lips are attached so as to turn upward, as in Fig. 3, slits must first be cut through the fabric for the lips to pass through, after which they are to be pressed down snug and firm, as represented in Figs. 5 and 6. In all cases the simplest and easiest plan is to leave the lips or groove sufficiently open to permit the fabric, with the rod, to be dropped or laid therein, as represented in Fig. 10, after which the lip or groove is closed tight, as shown in Fig. 11.

When the clips *d* are used slits for them will be cut in the cloth, as shown in Figs. 5 and 6, where the clips are represented as protruding through the slits on the inside, thus permitting the cloth to hang straight down, which preserves it from any tendency to be torn, as it would be if it passed up over the outside of the clips. When the groove *a* is formed the entire length of the jaw, as in Fig. 2, the cloth must pass over the inner side of the bent edge, and will draw evenly upon it its whole length. This curved portion, being rounded and smooth, will have no tendency to cut or tear the cloth. After the cloth has been inserted in the groove *a* the metal should be pressed down tight and smooth, and as flat as possible, so as to make all snug, and give a neat finish to the bag.

It will be seen that by this invention nearly the whole of the labor can be performed by machinery, and that thus the manufacture of these articles will be greatly cheapened and expedited.

Having thus described the invention, what is claimed is—

1. A jaw or frame for carpet-bags having a groove or lips formed therein or attached thereto for receiving and holding the cloth or other material which constitutes the body of the bag, substantially as described.

2. The clips attached to the jaws for the purpose of securing the body of the bag thereto, substantially as described.

3. A carpet-bag body with a fold or loop along the edge of the fabric or material where it is to be attached to the frame or jaws, substantially as described.

4. The combination of the jaws provided with a groove or lips, the looped cloth or other material, and the rod *a*, or its equivalent, substantially as described.

JOHN W. LIEB,
*Assignee of Sonnekalb & Lieb.*

Witnesses:
W. C. DODGE,
HARRY KING.